D. O. NATION.
TIRE SPREADING TOOL.
APPLICATION FILED MAR. 31, 1921.
1,400,453. Patented Dec. 13, 1921.
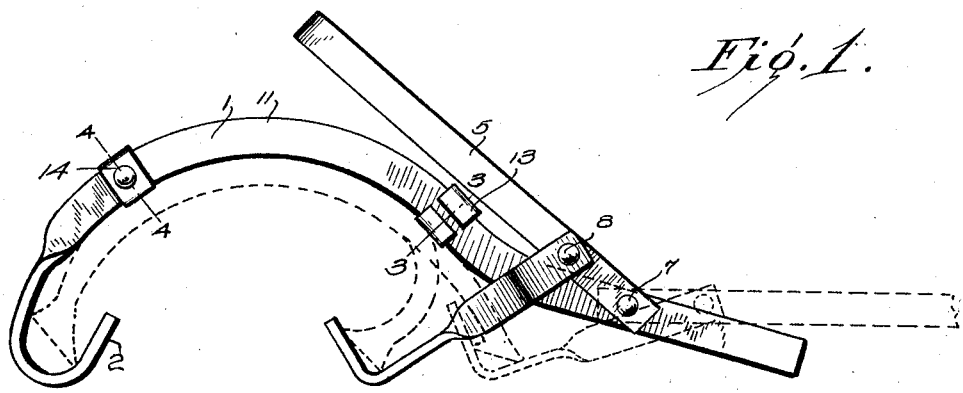
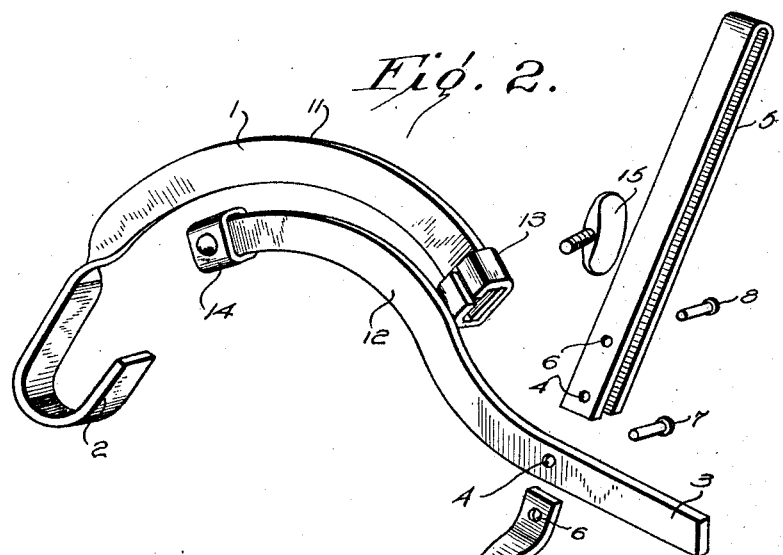
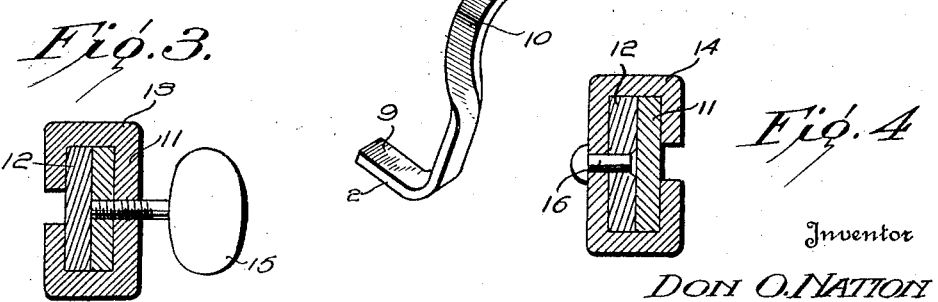
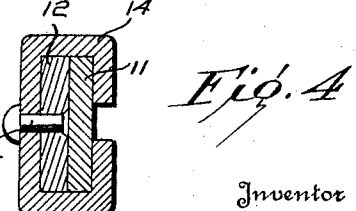
Inventor
DON O. NATION
By
C. L. Parker Attorney

UNITED STATES PATENT OFFICE.

DON O. NATION, OF LOS ANGELES, CALIFORNIA, ASSIGNOR OF ONE-HALF TO WILLIAM E. NATION, OF LOS ANGELES, CALIFORNIA.

TIRE-SPREADING TOOL.

1,400,453.                    Specification of Letters Patent.      Patented Dec. 13, 1921.

Application filed March 31, 1921. Serial No. 457,185.

*To all whom it may concern:*

Be it known that I, DON O. NATION, a citizen of the United States, residing at Los Angeles, in the county of Los Angeles and State of California, have invented certain new and useful Improvements in Tire-Spreading Tools, of which the following is a specification.

This invention relates to tire spreading tools and is an improvement over the constructions shown in my prior Patent No. 1,373,348, dated March 29, 1921.

In the said prior application, I have disclosed and claimed a tire spreading tool comprising a body portion having a curved section, a hook arranged at one end thereof, a substantially straight arm integral with and extending from the opposite end of said body portion, an operating handle pivoted to said arm, and an auxiliary hook carried by said operating handle.

In the present invention, I provide a body portion having a curved section made of two pieces and capable of adjustment. The end of each section is provided with a sleeve surrounding the other section to maintain them in fixed position, and a set screw or other fastening member is arranged in one of said sleeves to permit longitudinal adjustment.

The present invention is capable of use for spreading tires for various purposes, and may be employed on tires of different sizes by adjusting the curved section within its limits of adjustment.

In the accompanying drawings, I have shown one embodiment of the invention. In this showing:

Figure 1 is a side elevation of the tool applied to a tire, the position of the tire being shown in dotted lines, Fig. 2 is a detail perspective view of the tool disassembled, Fig. 3 is a transverse sectional view on line 3—3 of Fig. 1, and, Fig. 4 is a similar view on line 4—4 of Fig. 1.

Referring to the drawings, the reference numeral 1 designates generally, the body portion of the tool which is similar to the construction shown in my prior patent and curved to permit it to be arranged around the tire. A hook 2, adapted to engage beneath the bead of the tire is arranged on one end of the curved portion. The other end is extended to form a substantially straight arm or extension 3. This extension is provided with an opening 4, to which an operating handle 5 may be pivoted. As shown, the operating handle comprises a piece of metal or other suitable material, bent to form two arms slightly spaced from each other. These arms are provided with alined openings 6, for the reception of a pivot pin 7, which passes through the opening 4 in the extension 3. An auxiliary hook member 10 is pivotally secured to the operating handle, as at 8. This auxiliary member is provided with a hook 9 on its free end, and a portion thereof is offset, to permit it to freely pass the pivot of the operating arm.

As shown, the body portion of the tool is formed of two sections 11 and 12, each of which is provided with a clip on its inner end. The clips 13 and 14 are arranged on the arms 11 and 12, respectively, and are adapted to embrace the other arm to retain the parts in assembled position. The clip 13 is secured to the arm 11 in any suitable manner, and is provided with an opening arranged in alinement with an opening in the arm. A set screw 15 passes through these openings, and is adapted to engage the face of the arm 12 to retain the tool in adjusted position (see Fig. 3).

The clip 14 is secured to the arm 12 by means of a rivet 16, or other suitable fastening means, and forms a guide for the arm 11.

The operation of the device is as follows:

Referring to Fig. 1 of the drawings, wherein a tire casing is shown in dotted lines, the hook 2 is first arranged under the bead on one side of the tire, as described in my prior patent, and the bead moved outwardly and spread the tire to the position shown in the drawings. To spread the opposite side of the tire, the hook 9 is arranged under the bead and the handle 5 moved to the dotted line position, whereby the auxiliary member 7 will be moved outwardly to the dotted line position and the bead of the tire brought to the corresponding position, as illustrated in dotted lines.

When a tire is to be spread, the tool is first adjusted to the desired size by loosening set screw 15 and moving the arms 11 and 12 with respect to each other.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. A tire spreading tool comprising an extensible body portion curved to fit over a tire, a hook arranged on one end thereof, a substantially straight arm extending from the opposite end of the body portion, and an auxiliary hook carried by said tool movable with respect to body portion.

2. A tire spreading tool comprising an extensible body portion curved to fit over a tire, a hook arranged on one end thereof, an operating handle secured to the other end of the body portion, and an auxiliary hook carried by said handle.

3. A tire spreading tool comprising an extensible body portion curved to fit over a tire, a hook arranged on one end thereof, a substantially straight arm extending from the opposite end of the body portion an operating handle pivotally mounted thereon, and an auxiliary hook pivotally mounted on said handle.

4. A tire spreading tool comprising a body portion having a curved section, said curved section being formed of two telescopic arms to permit adjustment, a hook arranged at one end thereof, a substantially straight arm integral with and extending from the opposite end of said body portion, an operating handle pivoted to said arm, and an auxiliary hook carried by said operating handle.

In testimony whereof I affix my signature.

DON O. NATION.